No. 743,133. PATENTED NOV. 3, 1903.
M. E. & C. H. BACON.
GEARING.
APPLICATION FILED MAY 13, 1903.
NO MODEL.

WITNESSES:

INVENTORS
Mark E. Bacon
Charles H. Bacon
BY
ATTORNEYS

No. 743,133. Patented November 3, 1903.

UNITED STATES PATENT OFFICE.

MARK E. BACON AND CHARLES H. BACON, OF FLUSHING, MICHIGAN.

GEARING.

SPECIFICATION forming part of Letters Patent No. 743,133, dated November 3, 1903.

Application filed May 13, 1903. Serial No. 156,904. (No model.)

*To all whom it may concern:*

Be it known that we, MARK E. BACON and CHARLES H. BACON, citizens of the United States, both residents of Flushing, in the county of Genesee and State of Michigan, have invented a new and Improved Gearing, of which the following is a full, clear, and exact description.

This invention relates to a gearing adapted especially for the driving of bicycles and by means of which the ratio of the gearing may be quickly and easily changed by the rider without leaving the saddle, thus enabling the gear to be changed at will to suit the conditions of the road over which the bicycle is being driven.

The device comprises in its general form a screw having means for operating it extending from proximity to the seat of the rider, this screw having a nut thereon and said nut being in connection with a gear splined on the drive-shaft and coacting with a series of varying gear-faces formed on the driving-disk, which in turn is in connection with the crank-shaft. The said screw is eccentrically mounted, and the said drive-shaft is allowed a slight lateral movement, so that upon each rotation of the screw to shift the gear which is in connection therewith said gear is caused to move sidewise sufficiently to jump it from engagement with one gear-face into engagement with another.

This specification is an exact description of one example of our invention, while the claims define the actual scope thereof.

Reference is to be had to the accompanying drawings, forming a part of this specification, in which similar characters of reference indicate corresponding parts in all the views.

Figure 1 is a perspective view of the invention, showing it applied to a bicycle-frame. Fig. 2 is an enlarged horizontal section. Figs. 3 and 4 are detail sections of the finger-wheel for operating the screw, and Fig. 5 is a sectional view of the support for the rear end of the drive-shaft.

The disk $a$ is fastened to the crank-shaft and has its inner face formed with a number of concentric crown-gear surfaces $a'$. With these gear-surfaces is adapted to mesh the pinion $b$, which is fastened to a sleeve $b'$ and fitted to slide on the square front portion of the drive-shaft $c$. This sleeve $b'$ is mounted to turn, but not to slide, in a nut $d$, which coacts with the screw $e$ in a manner which will be hereinafter fully set forth. The front end of the shaft $c$ is free from support, excepting such as may be provided by the nut $d$, while the rear end of the shaft is arranged in a box $c'$, pivoted by a pin $c^3$ in a hollow portion $n$ of the bicycle-frame. The rear end of the drive-shaft $c$ carries a bevel-gear $c^2$, which is adapted to be meshed with a corresponding gear on the drive-wheel, all of which will be understood from the prior art. Now it is clear that by shifting the gear $b$ along the shaft $c$ it may be made to engage any one of the gear-faces $a'$, and since these faces are of gradually-increasing diameter the ratio of the driving-gearing may be changed at will.

The screw $e$ at its rear end has an eccentric journal $e'$, suitably mounted in a part of the framing. At its front end said screw is fastened eccentrically to a gear $f$, itself suitably mounted at the rear side of or adjacent to the crank-hanger. Therefore upon the rotation of the screw the nut $d$ is not only given a movement longitudinally of the screw, but it is also given (owing to the eccentric mounting of the screw) a lateral movement, which moves the gear $b$ toward and from the face of the gear-disk $a$, and thus as the gear is shifted from one face to the other it is simultaneously moved away from and then toward the gear-disk $a$, thus allowing the gear $b$ to jump from one face $a'$ to the other.

For operating the screw $e$ at will we provide a gear $g$, which is meshed with the gear $f$ and fastened to a shaft $h$, suitably mounted in the frame and extending forwardly, as shown in Fig. 1. The shaft $h$ is in connection with a second shaft $i$ by means of the bevel-gears, as shown, the second shaft extending upward through a suitable bearing $k$ in the top of the frame and being provided above said bearing with a finger-wheel $l$, with which the shaft is connected to turn with the turning of the finger-wheel, but to allow the finger-wheel a certain axial movement on the shaft. The bearing $k$ has studs $k'$ on its upper face, and these are adapted to be engaged with corresponding cavities in the finger-wheel $l$.

$m$ indicates a spring which acts to hold the finger-wheel $l$ in engagement with the bearing $k$; but upon drawing upward the finger-wheel it may be made to disengage the bearing, and then the shaft $i$ may be turned at will. By means of this arrangement the rider sitting on the saddle of the machine may operate the screw $e$ whenever desired and shift the gear $b$ without dismounting.

The frame of the bicycle should of course be slightly modified to suit the several elements involved in our invention. The drawings show one form of frame for this purpose; but we desire it understood that we are not limited to the construction there shown.

Various other changes in the form, proportions, and minor details of our invention may be resorted to at will without departing from the spirit and scope thereof. Hence we consider ourselves entitled to all such variations as may lie within the intent of our claims.

Having thus described our invention, we claim as new and desire to secure by Letters Patent—

1. The combination of a driving-gear having a plurality of varying gear-faces thereon, a driven shaft, a shiftable gear having connection with the driven shaft and coacting with the driving-gear, and means for shifting the shiftable gear, said means for shifting the gear comprising a nut in connection therewith, and a screw with which the nut coacts.

2. The combination of a gear having a plurality of varying gear-faces thereon, a gear coacting with the first-named gear, one of said gears being shiftable, a nut in connection with the shiftable gear, and a screw coacting with the nut.

3. The combination of a driving-gear having a plurality of varying gear-faces thereon, a driven shaft mounted to move laterally, a gear in connection with the driven shaft and shiftable thereon, the second gear coacting with the first gear, and means for shifting the second gear and simultaneously moving the same laterally, for the purpose specified, said means comprising a nut in connection with the second gear and an eccentrically-mounted screw coacting with the nut.

4. The combination of a driving-gear having a plurality of varying gear-faces, a driven shaft having lateral play, a sleeve splined thereon, a gear attached to the sleeve and coacting with the driving-gear, a nut in which the sleeve is rotatably mounted, and an eccentrically-mounted screw coacting with the nut.

5. The combination of two coacting and relatively shiftable gears, a nut in connection with one of said gears, an eccentrically-mounted screw coacting with the nut, substantially as described, and means for operating the screw.

6. The combination with a support, of driving-gearing including a shiftable element for the purpose specified, means for operating said shiftable element, a shaft in connection therewith, the shaft being mounted in a part of the support, a finger-wheel attached to the shaft and capable of locking engagement with a part of the support, and a spring holding the finger-wheel yieldingly in said locking engagement.

In testimony whereof we have signed our names to this specification in the presence of two subscribing witnesses.

MARK E. BACON.
CHARLES H. BACON.

Witnesses:
F. P. SAYRE,
SAMUEL M. BACON.